RE 25403

Jan. 24, 1961 R. K. RICHARDS 2,969,469
CRYOTRON LOGIC CIRCUIT
Filed July 2, 1957 4 Sheets-Sheet 1

INVENTOR.
Richard K. Richards
BY
Norman C. Fulmer
Att'y.

INVENTOR.
Richard K. Richards
BY Norman C. Fulmer
Att'y.

INVENTOR.
BY Richard K. Richards
Norman C. Fulmer
Att'y.

INVENTOR.
Richard K. Richards
BY Norman C. Fulmer
Att'y.

United States Patent Office 2,969,469

Patented Jan. 24, 1961

2,969,469

CRYOTRON LOGIC CIRCUIT

Richard K. Richards, Old Troy Road, Wappingers Falls, N.Y.

Filed July 2, 1957, Ser. No. 669,539

25 Claims. (Cl. 307—88.5)

This invention relates to cryotron circuits as used in digital computers and other digital machines. More particularly, the invention relates to improvements in such circuits and to a generalized method by which circuits can be arranged to perform the logical functions of "and," "or," and inversion, as encountered in digital machines.

A cryotron is a relatively new type of computer component and is described in some detail in a paper by D. A. Buck in the April 1956 issue of the Proceedings of the Institute of Radio Engineers on pages 482–493. Briefly, the cryotron utilizes the superconductive characteristics of certain metals at very low temperatures for its mechanism of functioning. One of the more important of these characteristics is the fact that the transition temperature between the superconductive and normal-resistance states is a function of the strength of the magnetic field in the region of the conducting element. Although the cryotron requires that the system be refrigerated to a very low temperature, there are many potential advantages in the use of cryotrons in digital computers in comparison with vacuum tubes, transistors, and other more conventional components. These potential advantages include very low power consumption, light weight, small space, low cost, and high speed.

A reasonably wide variety of circuits in which cryotrons can be used are known to the prior art. In an application where a flip-flop circuit is to be set to one state or the other in response to a signal that can be represented by an elementary "or" function of several inputs, the procedure is to employ an appropriate number of input cryotrons in the flip-flop with the circuit so connected that the flip-flop is responsive to a signal on any one of the input cryotrons. In the case of an "and'" function the procedure is to bypass the input cryotron with other cryotrons, each actuated by one of the input signals to be joined in an "and" function. Then when an input pulse is applied, the input pulse will be bypassed unless all of the bypass cryotrons are in the normal-resistance condition. For complex combinations of "and" and "or" functions as are required in computer applications, a large miscellany of circuit arrangements can be devised for the performance of the desired functions. Although the various miscellaneous circuits will generally work in a satisfactory manner, it has been found that an excessive amount of design effort is usually required to find circuit arrangements that will perform the intended functions, and the resulting circuits often require an excessive number of cryotrons.

An object of this invention is to provide a universal type of cryotron circuit arrangement which can be adapted to a wide variety of complex logical functions in a uniform and straightforward manner that allows a straightforward circuit design procedure.

Another object of this invention is to provide a type of cryotron circuit which can be adapted to a wide variety of logical functions and which allows the number of cryotrons required for the performance of a function to be held to a minimum. Other objects will be apparent.

The basic operation performed by the circuit of this invention is to provide an output signal in accordance with some prescribed logical function of a number of input signals. Normally, the output signal will be used to set a cryotron flip-flop to one state or the other. Also, the normal source of the input signals will be from cryotron flip-flop circuits. The examples to be presented will be in terms of this source and destination of the signals, but the circuit of the invention is not necessarily limited to this source and destination.

There are two principal concepts involved in the circuit of this invention. One concept is that the logical functions are performed by means of appropriate connections to the output cryotrons of the flip-flops from which the signals are derived rather than at the input cryotrons of the flip-flops to which the signals are sent and rather than through the use of added cryotrons between the source and destination flip-flops. The other principal concept is that a push-pull technique is used in setting the destination flip-flops to one state or the other where the circuit connections for setting each of the destination flip-flops to one state can (but need not necessarily in all instances) bear a one-to-one relationship with the circuit connections for setting the flip-flop to the opposite state.

The normal mode of operation for the circuit of this invention is to have a number of flip-flops, each storing a binary digit, and a number of other flip-flops to which the binary digits are to be transferred, with the digits being translated during the transfer process according to certain prescribed logical functions. The transfer process is caused to take place by the application of a temporary pulse of current through the output cryotrons of the flip-flops from which the digits are being transferred and then in series through the input cryotrons of the flip-flops to which the digits are being transferred with the logical functions being achieved by means of appropriate interconnections of the output cryotrons just mentioned.

The various objects named above, as well as other objects of the invention, are achieved by the preferred embodiments which are disclosed in the following description and claims and are illustrated in the drawings, which disclose by way of examples, the preferred embodiments of the invention and the best modes which have been contemplated for carrying out these embodiments.

Figures 8, 9:
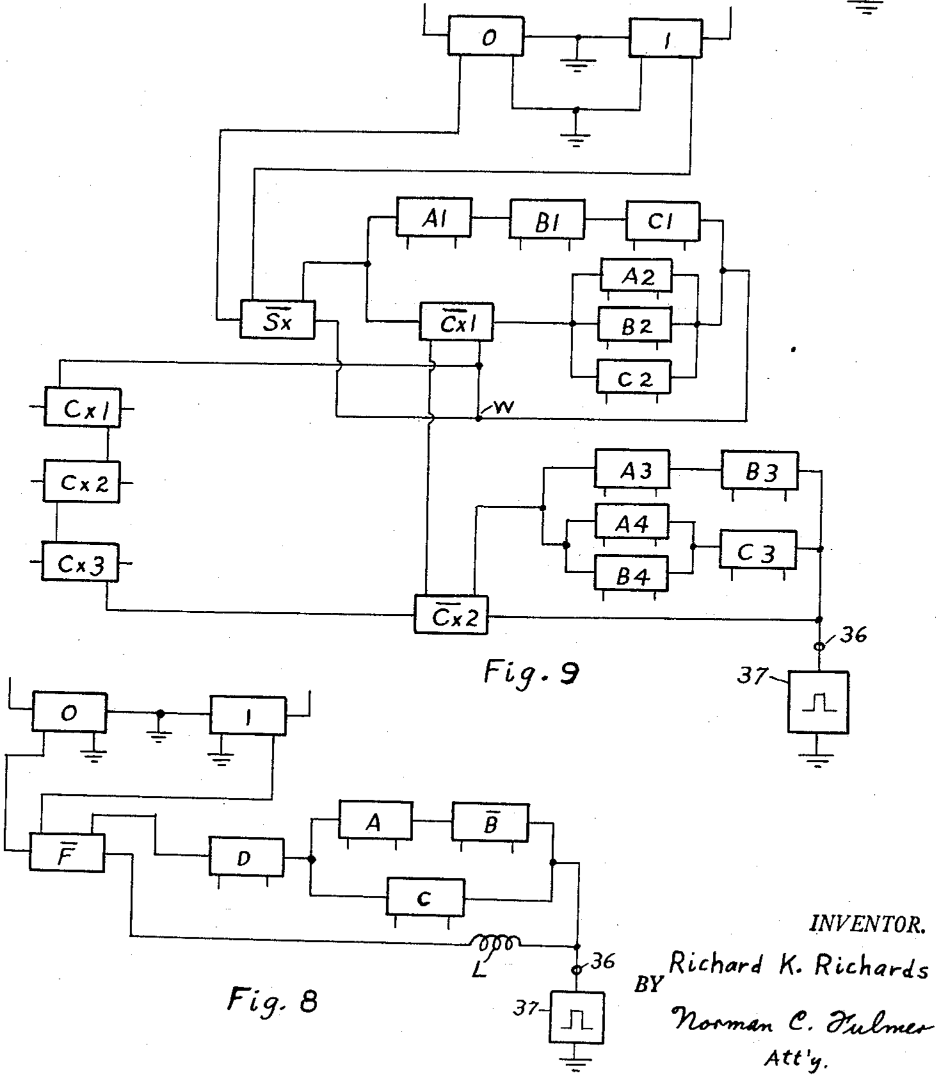
Fig. 8 shows an improved version of the circuit in Fig. 7.
Figure 10:
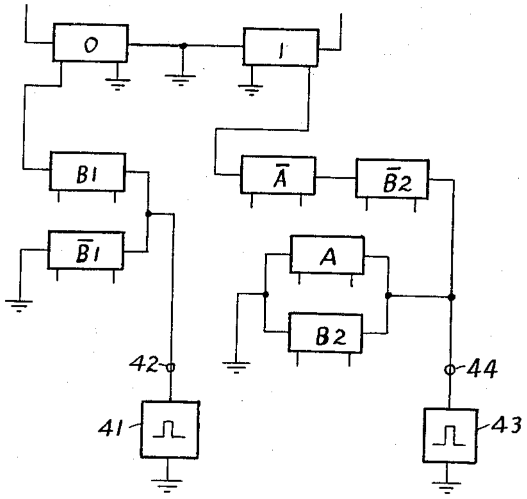

Fig. 9 shows the invention as applied to a full adder as used in a parallel binary adding circuit Fig. 10 shows the invention as applied to the problem of setting a flip-flop to the 0 state if certain combinations of input signals are present, to the 1 state if certain other combinations are present, and leaving the state of the flip-flop unchanged if still other combinations of the input signals are present.

Figure 7:
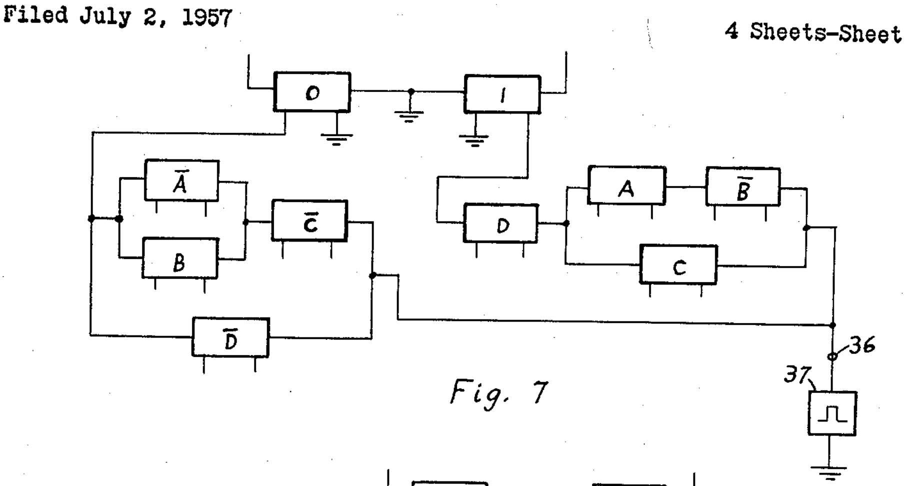
Fig. 7 shows an example where the invention is applied to a somewhat more complex logical function.
Figure 11:
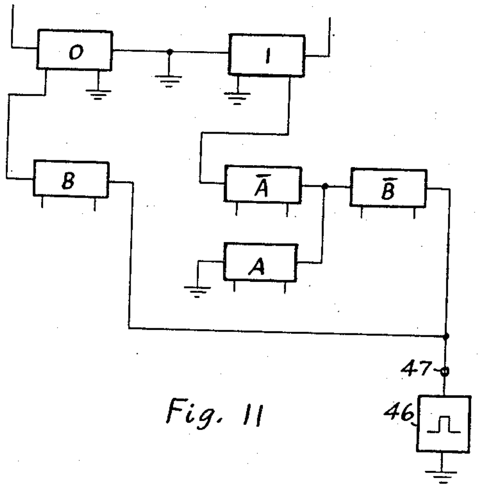

Fig. 11 shows an improved version of the arrangement in Fig. 7.

Figure 12:
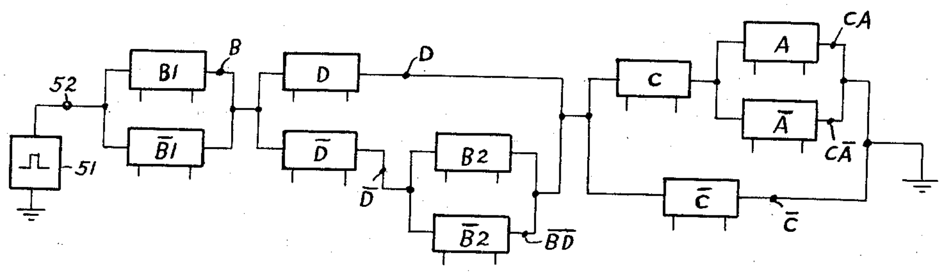

Fig. 12 illustrates some of the connections to be used in the circuit in Figs. 13*a* and 13*b*.

Figs. 13a and 13b show the invention as applied to a multiplicity of flip-flops operating simultaneously, with a form of decimal counter being selected for purposes of illustration.

When certain materials are cooled to a very low temperature it is found that they exhibit very low resistance properties. Further, it is found with these materials that as the temperature is lowered, a discontinuous transition occurs at which the resistance suddenly changes from what might be called a normal-resistance value to a value which is exactly zero within the limits of presently available measuring techniques. When the resistance is exactly zero the material is said to be in the superconducting condition, and materials which exhibit this phenomenon are called superconductors. The temperature of transition between the normal-resistance state and the superconducting state is different for different superconductors, but in all instances is very low and for many of the superconductors this temperature is in the range of 2° K. to 15° K.

From the standpoint of the functioning of a cryotron, the important feature of the superconductive phenomenon is that the temperature of transition is a function of the intensity of the magnetic field in the region of the material. The temperature of transition decreases as the intensity of the magnetic field is increased. This relationship is illustrated in a qualitative manner for a typical superconductive material in Fig. 1, which shows a curve 16 of transition magnetic field intensity (mmf.) as a function of temperature. This plot may be interpreted in the following manner. If the material is at a given temperature and if a magnetic field of a given intensity is maintained in the region of the material, the temperature and field can be represented by a point on the plane of the graph. If this point falls in the region inside the curve 16, the material is in the superconducting condition. If the point falls in the region outside of the curve, the material is in the normal-resistance condition. These two regions are indicated in the figure.

If the temperature of the material is maintained at the value A, which is slightly less than the transition temperature B for zero applied field, the material will be in the superconducting condition, but it can be carried out of the condition to the normal-resistance condition, at point C for example, by the application of a relatively small magnetic field. The possibility of this action is indicated by the vertical dotted line 17 in Fig. 1. When the applied field is removed, the material will return to the superconducting condition.

The superconductive phenomenon as described has been used as the basis for a device known as a cryotron, where the function of a cryotron is the control of the flow of current in one part of a circuit by means of a signal applied to another part of the circuit. This function is substantially the same as the function performed by an electromagnetic relay, a vacuum tube, or a transistor, but since these components are generally quite different from each other in their mechanism of operation, the circuits used with them are generally quite different.

Figure 1:
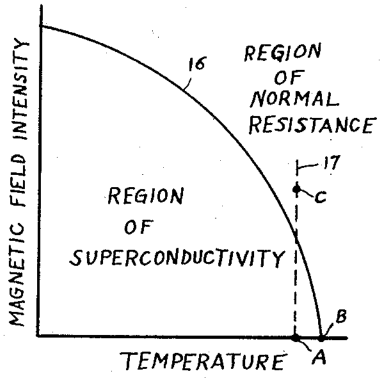
Fig. 1 is a graph of magnetic field intensity needed to produce a transition from the superconducting condition to the normal-resistance condition, as a function of temperature, for a typical superconductive material.
Figure 2:
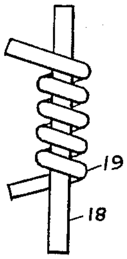
Fig. 2 shows a cryotron structure.

An example of a cryotron, as illustrated in Fig. 2, is a straight wire 18 on which another wire 19 has been wound in a helical manner. The magnetic field which is created by current in the winding controls the flow of current in the straight wire. The temperature and material of the straight wire are chosen so that operation corresponding to the dotted line in Fig. 1 is obtained. The material of the winding is chosen to be a superconductor with a transition mmf. that is substantially greater than the maximum mmf. to be encountered so that the winding remains a superconductor at all times. When no current flows in the winding, the resistance of the straight wire is zero, but when a current of sufficient amplitude is caused to flow in the winding, the straight wire is caused to be in the normal-resistance condition so that the flow of current therein is impeded.

The function of the cryotron is similar to that of a normally-closed relay. In the absence of a current in the winding of the relay, the contacts are closed and thereby allow the current to flow. When the signal is applied to the winding of the relay, the contacts open and impede the flow of courrent. Because of the analogy to a relay, the two parts of the cryotron will be referred to as the input winding and the contact. It is to be understood, however, that the term "input winding" is used in a broad sense so as to include any sort of cryotron input arrangement.

There are many design considerations of importance in developing a practical cryotron, particularly when large current amplification factor and high speed are involved. However, these considerations are not of consequence with regard to the principles of this invention, and therefore will be omitted from the following description.

Figure 3:
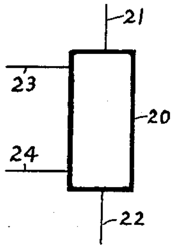
Fig. 3 shows a symbol that will be used to represent a cryotron in all susgequent figures.

The symbol to be used for a cryotron, as shown in Fig. 3, is a rectangle 20 with four lines drawn to it. The two lines 21, 22 at the ends of the rectangle represent the connections to the contact of the cryotron, and the two lines 23, 24 at the side represent the connections to the input winding. One of the connections to the input winding can be drawn at the opposite side of the rectangle without altering the meaning of the symbol and without implying any difference in the physical or electrical properties of the cryotron.

In the cryotron and in the circuits to be described, the current in either the input winding or the contact may flow in either direction. In other words, the properties of the cryotron are independent of direction of current flow. In some parts of the description, it will be stated that current flows in one direction or the other along a wire, but it should be understood that the operation described is only for the purpose of illustration, and current flow in the opposite direction will produce equally satisfactory performance.

In adapting cryotrons to digital computers it is known to the prior art that desirable circuits can be obtained if two or more paths are provided for the flow of current where, under each set of operating circumstances, one and only one path offers zero resistance to the flow of current and where each other path contains at least one contact held in the normal-resistance condition to impede the flow of current. In this case, all of the current will flow in the path of zero resistance and will actuate the input windings of any cryotrons that may be connected in series with that path. The input windings are always in the superconducting condition. The novelty of this invention is in the arrangement in which the cryotrons are interconnected to provide the alternative paths, in a straightforward manner, for any logical function and in a manner by which the required number of cryotrons is held to a minimum.

Figure 4:
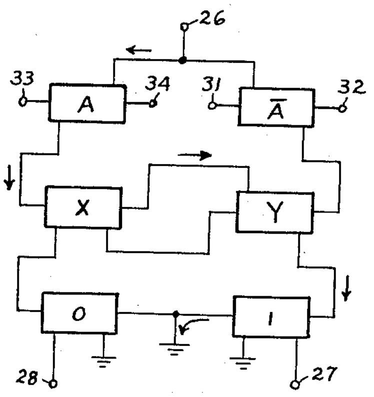
Fig. 4 shows a cryotron flip-flop circuit.

The basic cryotron flip-flop circuit, which is not a part of this invention but would normally be used in close conjunction with the circuit of the invention, is shown in Fig. 4. The circuit of Fig. 4 comprises a first series circuit, between a terminal 26 and electrical ground, of the winding of a cryotron A, the contact of a cryotron X, the winding of a cryotron Y, and the contact of a cryotron1; and a second series circuit, between the terminal 26 and electrical ground, of the winding of a cryotron Ā, the contact of cryotron Y, the winding of cryotron X, and the contact of a cryotron 0. The flip-flop circuit is bistable in that it can exist in one of two stable states. The two stable states are disinguished from one another by which of two paths current flows through from terminal 26 to ground. One possible path is indicated by the arrows in the figure. Current flows from terminal 26 through the input winding of cryotron A, through the contact of cryotron X, through the input winding of cryotron Y, and then through the contact of cryotron 1 to ground. If current flows in this path, current flow in the alternate path, which includes the contact of Y, is blocked because current in the first-described path causes the contact of Y to be in the normal-resistance condition. Conversely, if the current had initially been flowing in the alternate path, current flow in the first-described path would be blocked because the contact of X would be held in the normal-resistance condition. The flip-flop is said to store a binary 1 or a 0 in accordance with the path of current flow. The convention will be adopted here that current flow in the path indicated by the arrows will correspond to the storage of a binary 0, with current flow in the opposite path corresponding to a binary 1.

In the circuit of Fig. 4, cryotrons X and Y perform the binary storage function. Cryotrons A and $\bar{A}$ perform an output function and cryotrons 0 and 1 perform an input function. With current flow as indicated by the arrows, the flip-flop stores a 0. The flip-flop can be set to 1 by passing a current from terminal 27 through the input winding of cryotron 1 to ground. This current causes the flow of current through the contact of cryotron 1 to be diminished sufficiently to allow the contact of Y to become in the superconducting condition. Current can then flow in the alternate path and cause the current in the first path to be blocked. The current will continue in the alternate path after the input current at terminal 27 is terminated. By a similar process, if the flip-flop is initially in the state representing a 1, it can be changed to the state representing 0 by the application of an input pulse of current at terminal 28.

The notation to be used at the output cryotrons will be explained as follows. The binary digit stored in the flip-flop can be represented by the letter A, where A is equal to either 1 or 0. The symbol, $\bar{A}$, means the inverse of A, and $\bar{A}$ is equal to 0 when A is equal to 1 and $\bar{A}$ is equal to 1 when A is equal to 0. With this notation, the contact of an output cryotron will be in the superconductive or normal-resistance condition in accordance with whether the letter symbol on the cryotron is equal to a 1 or a 0, respectively. For example, if the flop-flop in Fig. 4 is storing a 0, as indicated by the arrows for the current flow, $\bar{A}$ will be equal to 1, and the resistance between terminals 31 and 32 at the opposite ends of the contact of the $\bar{A}$ cryotron will be zero. There will be a non-zero resistance between terminals 33 and 34 at the opposite ends of cryotron A. The opposite conditions will prevail when the flip-flop is storing a 1 instead of a 0.

In subsequent figures, correspondingly numbered components serve corresponding functions. For example, cryotron A serves the same function in the circuit of Fig. 5 that it does in the circuit of Fig. 6. The function to be performed by the circuit as a whole may, however, be different. When the connections to an input winding of a cryotron are not shown, it is convenient to visualize these connections as being the output cryotrons of flip-flop circuits of the type shown in Fig. 4 although this source of the input signals is not necessary. The important convention is that the contact of the cryotron be in the superconductive or normal-resistance condition in accordance with whether the indicated variable is 1 or 0, respectively. The two cryotrons labeled 0 and 1 in each figure may be visualized as being the input cryotrons of other flip-flop circuits, also not shown.

A flip-flop circuit, or other suitable source of signals, may have two or more output cryotrons on each side. In this case the windings of the cryotrons would be connected in series on each side, and the functioning of the flip-flop would not be altered. When two or more cryotrons are actuated by signals from the same source, the cryotrons are differentiated by a notation such as A1, A2, etc. In such cases the contacts of each cryotron are assumed to be in the superconductive or normal-resistance condition in accordance with whether A is equal to 1 or 0, respectively.

At various points in the description, conventional Boolean notation will be used. A "sum" such as $A+B$ implies A "or" B, and a "product" such as AB implies A "and" B. The use of a bar over a symbol has already been mentioned, and it implies the inverse of a function. For a more complete discourse on Boolean notation, reference is made to chapters 2 and 3 of "Arithmetic Operations in Digital Computers," by R. K. Richards, published by the D. Van Nostrand Company, in 1955.

Figure 5:
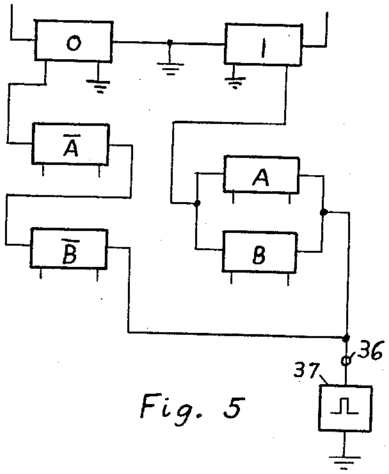
Fig. 5 shows the circuit of the invention as applied to the elementary "or" function.

The circuit of Fig. 5 comprises a first series circuit, between a terminal 36 and electrical ground, of the winding of a cryotron 1 and the parallel combination of the contacts of two cryotrons A and B; and a second series circuit, between the terminal 36 and electrical ground, of the winding of a cryotron 0 and the contacts of two cryotrons $\bar{A}$ and $\bar{B}$. A source 37 of current is connected between terminal 36 and ground. Binary input signals are applied to the windings of the "transfer" cryotrons A, B, $\bar{A}$ and $\bar{B}$ in predetermined combinations which will cause a current to flow from the source 37 through the winding of a selected one of the "output" cryotrons 0 and 1.

In Fig. 5 the contacts of cryotrons A and B are in the superconductive condition when A and B, respectively, are equal to 1, and the contacts of cryotrons $\bar{A}$ and $\bar{B}$ are in the superconductive condition when A and B, respectively, are equal to 0. With the parallel connection of A and B and the series connection of $\bar{A}$ and $\bar{B}$ a superconductive path will exist between terminal 36 and ground regardless of the combination of values of the variables A and B. Specifically, the path will be through the input winding of the 0 cryotron or through the input winding of the 1 cryotron but not both of these paths simultaneously. The result can be understood by considering the four possible combinations of the variables, A and B. If A and B are both 0, the superconductive path will be through $\bar{A}$, $\bar{B}$, and the input winding of the 0 cryotron to ground. If one, or the other, or both (which takes into consideration each of the other three possible combinations) of the variables A and B is equal to 1, there will be a resistance in the path through the input winding of the 0 cryotron, but either the branch through the A cryotron or the B cryotron, or both, will offer no resistance to the flow of current in the path through the input winding of the 1 cryotron. Since current flows to the 1 side when A "or" B (or both) is equal to 1, the circuit is said to perform an "or" function.

Figure 6:
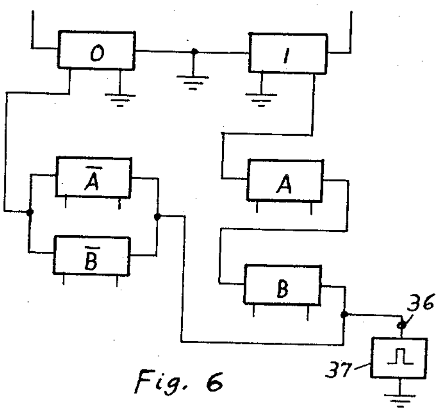
Fig. 6 shows the circuit of the invention as applied to the elementary "and" function.

The circuit in Fig. 6 is similar to the circuit in Fig. 5 except that the series and parallel connections of the cryotrons have been interchanged. In this case current flows through the A and B cryotrons to set the flip-flop to 1 only when both A "and" B are equal to 1, and the circuit is said to perform the "and" function.

There are no real physical differences between the circuits in Figs. 5 and 6. The differences are merely a matter of definition with regard to signal manifestations that differentiate 1's and 0's. One of the novel and useful features of this invention is that, for a given definition of 1's and 0's, either the "or" or the "and" function can be performed with the same physical circuit.

Any one or more of the variables can be interchanged with its inverse to produce functions such as $\bar{A}+\bar{B}$, $\bar{A}+B$, or $A+\bar{B}$ with the circuit in Fig. 5 and $\bar{A}\bar{B}$, $\bar{A}B$, or $A\bar{B}$ with the circuit in Fig. 6.

Either the circuit in Fig. 5 or the circuit in Fig. 6 can be extended to include three or more input variables. The extension is straightforward with parallel connections on the 1-input side for the "or" function and series connections on this side for the "and" function with the opposite type of connections on the 0-side.

A more complicated function involving mixtures of the "or" function, the "and" function, and inversion can be obtained as indicated in Fig. 7. In Fig. 7, a first circuit is connected between a terminal 36 and electrical ground, and comprises the parallel combination of the contact of a cryotron C and series-connected contacts of cryotrons A and $\bar{B}$, this parallel combination being connected in series with the contact of a cryotron D and the winding of a cryotron 1. A second circuit, connected between terminal 36 and ground, comprises the winding of a cryotron 0 connected in series with the parallel combination of the contact of a cryotron D̄ and a series arrangement of the contact of a cryotron C̄ and the parallel-connected contacts of cryotrons Ā and B. The source 37 of transfer current is connected between terminal 36 and electrical ground. As before, binary input signals are applied to the windings of the transfer cryotrons A, B, C, D and Ā, B̄, C̄, D̄ in predetermined combinations which will cause a current to flow from the source 37 through the winding of a selected one of the output cryotrons 0 and 1. The circuit in Fig. 7 performs the function $(A\bar{B}+C)D$. This particular function has been selected for illustrative purposes only; any combination of the three basic functions of "or," "and," and inversion can be performed by application of the same principles. The connections in the circuit are so chosen that zero resistance is offered to the flow or current from terminal 36 through the input winding of the 1 cryotron whenever the combination of input variables is such that the function to be performed is equal to 1. The desired connections in the 1 path are obtained by connecting the contacts of the corresponding cryotrons in parallel for an "or" function and in series for an "and" function. If the inverse of a variable appears in the expression for the desired function, the cryotron representing the inverse of the variable is used. In the example cited, the resulting connections are with the D cryotron in series with the circuit that performs $A\bar{B}+C$, where this function is performed with the C cryotron connected in parallel with the series connection of A and B̄.

There should be a path of zero resistance from terminal 36 to ground through the input winding of the 0 cryotron when the specified function is 0, that is, when $\overline{(A\bar{B}+C)D}$ is equal to 1. The correct connections can be obtained in any instance by the simple step of interchanging the roles of the series and parallel connections and by using the opposite value of the variables (that is, Ā for A, B for B̄, and so on). That this technique produces the right result in the present instance of the example in Fig. 7 can be determined in a rigorous way by the use of the following steps of Boolean manipulation (see the Richards reference).

$$\overline{(A\bar{B}+C)D}=\overline{A\bar{B}+C}+\overline{\bar{D}}=\overline{(A\bar{B})}\bar{C}+D=(\bar{A}+B)\bar{C}+\bar{D}$$

Note that the "or" and "and" functions have been interchanged and that the inverse of each variable appearing in the expression for the 1-input appears in the expression for the 0-input.

In some examples alternative but equally satisfactory arrangements can be found for the relative connections in the two paths, but the procedure described in the previous two paragraphs will produce the intended results in every case.

The circuit of Fig. 8 performs the same function as the circuit in Fig. 7, but fewer cryotrons are required. The path from terminal 36 through the 1-input follows the same connections as in Fig. 7 with regard to the contacts of the cryotrons that carry the input signals, with the exception that the path also includes the input winding of an added cryotron, F̄. The other path, through the winding of cryotron 0, comprises the series connection of an inductance L and the contact of cryotron F̄. The designation F is used to indicate the intended function, which in the assumed example is $F=(A\bar{B}+C)D$. If the combination of input variables is such that the intended function is equal to 1, the flow of current though the input winding of F̄ causes the contact of this cryotron to be in the normal-resistance condition. Therefore, the flow of current through the contact of F̄ is prevented. On the other hand, if the input variables are such that the intended function is equal to 0, there will be a non-zero resistance in the path through the 1-input so that the contact of F̄ will be in the superconductive condition, and current will flow freely through this contact and then through the 1-input to ground.

When the pulse of current is first applied in the circuit of Fig. 8, both paths can offer zero resistance to the flow of current. If the current divides between the two paths so that most of the current flows through the 0-input, it may be difficult to cause the current through the path that includes the 1-input and the input of F̄ to become great enough to carry the contact of F̄ into the normal-resistance condition. One way in which this difficulty can be overcome is to insert an appropriate amount of inductance, L, in the 0-input path. When two or more zero-resistance paths are connected in parallel, the current will divide in inverse proportion to the inductance in the respective paths. The inductance will impede the initial change in current and will allow the build-up of current in the 1-input path first for those combinations of input variables that should produce an output signal of 1. The inductor, L, should be so designed and made of such material that it is held in the superconducting condition at the operating temperature of the computer and in the magnetic field produced by the current in its windings.

Another solution to the problem of initial current division in a circuit of the type shown in Fig. 8, is to replace L with the contact of a cryotron to which an input signal is applied temporarily. The temporary resistance in this path will insure that the current will follow the opposite path in those instances when the opposite path is the correct one. With some combinations of design parameters there may be an initial tendency for the flip-flop to be set to the incorrect state, but by the time the transfer process is completed, the current will have been directed to the correct side of the flip-flop to leave it in the correct state.

An obvious variation of the circuit in Fig. 8 is to use the connection to the 0-input as in Fig. 7 but use the inverting cryotron in the path of current to the 1-input.

The principles illustrated in the circuits of Figs. 5, 6, 7, and 8 can be applied to the development of a full adder as used in a parallel binary accumulator. Such a circuit is shown in Fig. 9 as a further example of the application of the invention. In a full adder there are three input signals, two of which may be designated by A and B and which represent the two binary digits in corresponding orders of two binary numbers to be added. The third input signal, which will be designated by C is the carry signal from the next lower order. There are two output signals to be generated. One represents the sum binary digit and the other represents the carry to the next higher order. The sum and carry output will be designated by $Sx$ and $Cx$, respectively. There are various ways of expressing the values of the sum and carry digits, but the method to be used here will be to say that the sum should be equal to 1 if any one of the three input signals is 1 and at the same time there are not two of the input digits equal to 1, or the sum is equal to 1 if all three of the input digits are 1. The carry is equal to 1 if any two or all three of the input digits are 1.

The Boolean expression for the carry, $Cx$, is, in line with the above, $AB+BC+AC$. A slight simplification in terms of the number of cryotrons involved is obtained if one of the variables is factored. By factoring C, the expression becomes $AB+(A+B)C$. One cryotron is needed for each appearance of a variable in the expression representing the function to be performed. Therefore, in general, it is desirable to find an expression which represents the desired function and which contains as few as possible appearances of variables. In the example of the carry, six cryotrons would be needed to form the function in the manner of the expression without factoring, but when one of the variables is factored as shown, only five cryotrons are needed. The Boolean expression for the sum, $Sx$, is, again in line with the concept of the previous paragraph, $(A+B+C)\overline{Cx}+ABC$. See chapter 4 of the Richards reference for a further discussion of full adders.

In Fig. 9, a first circuit between point W and electrical ground comprises the contact of a cryotron $\overline{Sx}$ and the winding of a cryotron 0 connected in series, and a second circuit between these points comprises the series combination of the winding of a cryotron 1, the winding of cryotron $\overline{Sx}$, and the parallel combination of the contacts of cryotrons A1, B1 and C1 connected in series and the contact of a cryotron $\overline{Cx}1$ connected in series with a parallel combination of the contacts of cryotrons A2, B2 and C2. A circuit between point W and terminal 36 comprises the series connection of windings of cryotrons $Cx1$, $Cx2$ and $Cx3$ and the contact of a cryotron $\overline{Cx}2$, and another circuit between point W and terminal 36 comprises the windings of cryotrons $\overline{Cx}1$ and $\overline{Cx}2$ connected in series with the parallel combination of the contacts of cryotrons A3 and B3 connected in series and the contact of a cryotron C3 connected in series with a parallel combination of the contacts of cryotrons A4 and B4. The source 37 of transfer current is connected between terminal 36 and electrical ground, and input signals are applied to the windings of the transfer cryotrons A1, B1, C1, A2, B2, C2, A3, B3, C3, A4, anud B4 in predetermined combinations which will cause a current to flow from source 37 through the winding of selected output cryotrons.

In Fig. 9, the carry is formed by cryotrons A3, B3, A4, B4, and C3 in a series-parallel arrangement that conforms to the factored expression that was given. The signals to the input windings of the A and B cryotrons are supplied by flip-flops or other devices that store the digits to be added. The signals to the input windings of the C cryotrons are supplied by a circuit of the type to be described, but this circuit is included in the next lower order in the parallel adder arrangement. If the output carry signal, $Cx$, is to be 1, a zero-resistance path exists between terminal 36 and point W in the circuit with the path passing through the input windings of cryotrons $\overline{Cx}2$ and $\overline{Cx}1$. When a pulse of current is applied at terminal 36, the contact of $\overline{Cx}2$ becomes in the normal-resistance condition and prevents the flow of current in the path that includes $Cx1$, $Cx2$, and $Cx3$, which form part of the binary adder in the next higher order. On the other hand, if $Cx$ is to be 0, a non-zero resistance will appear in the first-mentioned path and a zero resistance will appear in the path that includes $Cx1$, $Cx2$, and $Cx3$. The current then has one of two other paths open to it before it reaches ground. One path is through the network consisting of A1, B1, C1, $\overline{Cx}1$, A2, B2, and C2. The connections of this network are such that the sum is formed according to the expression $(A+B+C)\overline{Cx}+ABC$. If the sum is 1, the current passes through this network, through the input winding of cryotron $\overline{Sx}$, and then through the input winding of the 1 cryotron to ground. However, if the values of the input signals are such that the sum is to be 0, the path is from point W through the contact of cryotron $\overline{Sx}$ and then through the input winding of the 0 cryotron to ground.

Note that in the circuit of Fig. 9, the input windings of cryotrons $\overline{Cx}1$ and $\overline{Cx}2$ are supplied with a signal representing $Cx$. However, with the conventions that have been adopted here, the contacts of these cryotrons represent the inverse of the function, that is $\overline{Cx}$, because the resistance of the contact is zero when $Cx$ is equal to 0. In other words, the cryotrons act as inverters. A similar inversion takes place at $Cx1$, $Cx2$, and $Cx3$, the input windings of which are fed with a signal that represents $\overline{Cx}$.

The same problem with regard to the initial distribution of current exists in the circuit of Fig. 9 as was encountered in the circuit of Fig. 8. For this reason a small amount of inductance or other temporary current inhibiting means may be desirable in series with the contact of $\overline{Cx}2$ and in series with $\overline{Sx}$.

Several variations in the full adder circuit are possible. Either or both of the sum and carry signals may be generated through the use of the inverse of the input signals instead of the given signals as shown. Other variations of the circuit can be devised by using the inverse of the input signals in forming the carry in alternate orders of a parallel binary adding arrangement.

In many applications encountered in digital computers it is desired that for certain combinations of input signals the flip-flop to which a transfer is being made should be left in its original state regardless of which state it might have been in originally. An elementary illustration of this situation is a flip-flop that is to be set in accordance with the values of two binary input signals, A and B. Assume that the flip-flop is to be set to 0 if input signal B is equal to 1 and that the flip-flop is to be set to 1 if A and B are both 0. However, further assume that the state of the flip-flop is to remain unchanged if A is equal to 1 and B is equal to 0. A circuit that provides this function is shown in Fig. 10. One source 41 of current is connected between terminal 42 and ground, and another source 43 is connected between terminal 44 and ground. The contact of a cryotron $\bar{B}1$ is connected between terminal 42 and ground, and the contact of a cryotron B1 and the winding of a cryotron 0 are connected in series between terminal 42 and ground. A parallel combination of the contacts of cryotrons A and B2 is connected between the terminal 44 and ground, and contacts of cryotrons $\bar{A}$ and $\bar{B}2$ and the winding of a cryotron 1 are connected in series between terminal 44 and ground. Predetermined combinations of binary input signals are applied to the windings of the transfer cryotrons A, $\bar{A}$, B1, $\bar{B}1$, B2 and $\bar{B}2$ in order to effect the desired operation of the circuit. If signal B is equal to 1, the current from terminal 42 passes through the contact of B1 cryotron and then through the 0-input to ground. On the other hand, if signal B is equal to 0, this current passes through the $\bar{B}1$ cryotron to ground and does not affect the flip-flop. If both the A and B signals are equal to 0, the current from terminal 44 can flow through the contacts of the $\bar{A}$ and $\bar{B}2$ cryotrons and then through the 1-input to ground. If one or the other, or both, of the two variables is 1, the current from terminal 44 will pass through the contacts of the corresponding ones of the A and B2 cryotrons to ground. It may be observed that if signals A and B are 1 and 0, respectively, the currents from both terminals will be bypassed to ground and will not affect the flip-flop, as was assumed to be desired. A minor variation in the circuit of Fig. 10 would be to open the ground connection in one-half of the circuit and to connect the two major current paths in series.

A circuit which requires fewer cryotrons but which performs the same function as the circuit in Fig. 10, is shown in Fig. 11. In this case a single source 46 of current is connected to a terminal 47. The contact of a cryotron B and the winding of a cryotron 0 are connected in series between the terminal 47 and ground. Contacts of cryotrons $\bar{A}$ and $\bar{B}$ and the winding of a cryotron 1 are connected in series between terminal 47 and ground, and the contact of a cryotron A is connected between ground and the junction of the contacts of cryotrons $\bar{A}$ and $\bar{B}$. Predetermined combinations of binary input signals are applied to the winding of the transfer cryotrons A, B, $\bar{A}$ and $\bar{B}$. If signal B is equal to 1, the current passes through the B cryotron and then through the 0-input of the flip-flop. The $\bar{B}$ cryotron prevents the flow of current in the other path from terminal 17. However, if B is equal to 0, current flow is prevented in the B cryotron and the path is then the $\bar{A}$ or the A cryotron in accordance with whether the signal A is equal to 0 or 1, respectively. If A is equal to 0, the path is through the 1-input to the flip-flop, as desired, but if A is equal to 1, the current is bypassed to ground through the A cryotron so that the flip-flop is not affected.

The techniques used in the circuit of Fig. 11 can be employed in a more generalized manner in more complex problems encountered in digital computers. Again, the objective of the circuit is to direct the flow of current to one side or the other in each of a set of flip-flops under the control of certain input signals. The scheme of utilizing the basic circuit will be explained through the use of an example. In the example, four flip-flops A, B, C, and D are to be cycled through the following ten steps.

| | A | B | C | D |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 1 | 1 | 1 |
| 4 | 1 | 1 | 1 | 1 |
| 5 | 1 | 1 | 1 | 0 |
| 6 | 1 | 1 | 0 | 0 |
| 7 | 1 | 0 | 0 | 1 |
| 8 | 1 | 0 | 1 | 1 |
| 9 | 1 | 0 | 1 | 0 |

After step number 9, the status of the four flip-flops is to return to step 0 and repeat. Although this example may be viewed as being merely academic, it is actually a form of a decimal counter. The sequence of digits was not chosen at random as may appear to be the case at first glance but was very carefully selected to yield a sequence that could be followed with the use of relatively few cryotrons.

Figure 13:
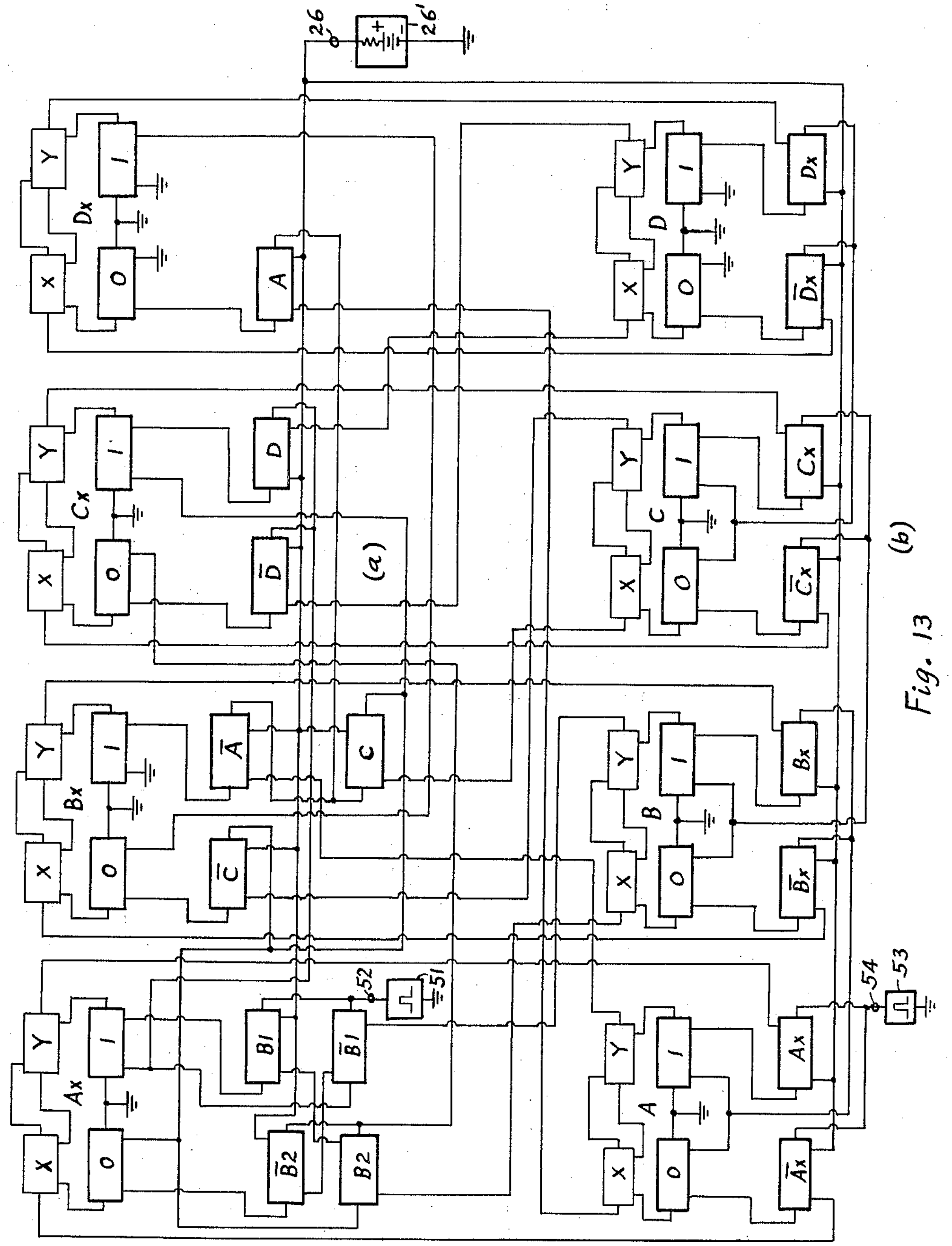

A circuit for carrying out this example is shown in Fig. 13. The (*a*) and (*b*) parts of this figure are drawn in heavy lines, and intermediate cryotrons in interconnecting flip-flop circuits are drawn in light lines, in the interests of simplicity and easy understanding of the drawing. In part (*a*) of Fig. 13, input cryotrons 0, 1 and intermediate cryotrons X, Y are shown for four flip-flop circuits A*x*, B*x*, C*x* and D*x*. The output cryotrons A*x*, $\overline{Ax}$; B*x*, $\overline{Bx}$; C*x*, $\overline{Cx}$; and D*x*, $\overline{Dx}$ for these four flip-flops are included in part (*b*) of Fig. 13. Each of these four flip-flops is the same as shown in Fig. 4 of the drawing, with the terminal 26 to which a current is continuously applied by a current source 26', being connected to an end of the winding of each of the output cryotrons, and with the grounded return path for the current being connected to a contact of each of the input cryotrons 0 and 1.

In part (*b*) of Fig. 13, input cryotrons 0, 1 and intermediate cryotrons X, Y are shown for four flip-flop circuits A, B, C and D. The output cryotrons for the flip-flops A, C and D are A, Ā; C, C̄; and D, D̄ and are included in part (*a*) of Fig. 13. The output cryotrons for the flip-flop B comprises windings of two cryotrons B1, B2 connected in series on one side and windings of two cryotrons $\overline{B1}$, $\overline{B2}$ on the other side. Each of these flip-flops A, B, C and D is the same as shown in Fig. 4 of the drawing, the flip-flop B having two pairs of output cryotrons having their windings connected in series as has previously been described in connection with Fig. 4. An end of the winding of each of the output cryotrons A, Ā, B1, $\overline{B2}$, C, C̄, D, D̄ is connected to terminal 26, the return path for current from the source 26' being through the grounded contacts of the input cyrotrons. A contact terminal of each of the output cryotrons A*x*, etc. shown in part (*b*) of Fig. 13 is respectively connected to an end of the winding of an associated input cryotron 0 or 1 of the flip-flops A, B, C and D, as shown. The remaining ends of the windings of the 0 and 1 cryotrons of flip-flop circuit A are jointly connected to the remaining contact terminals of cryotrons B*x* and $\overline{Bx}$ of flip-flop circuit B. Similar connections are made between flip-flop circuits B and C, and C and D. The remaining ends of the windings of cryotrons 0 and 1 in the flip-flop circuit D are grounded, and the remaining contact terminals of cryotrons A*x* and $\overline{Ax}$ are connected to a source of current pulses 53 at terminal 54, the source 53 being grounded to provide a return current path.

The interconnections of the contacts of cyrotrons A, Ā, B1, B2, $\overline{B1}$, $\overline{B2}$, C, C̄, D and D̄ of Fig. 13, are shown in Fig. 12, wherein a source 51 of current pulses is connected between terminal 52 and ground. Between the terminal 52 and ground, the contacts of cryotrons B1 and $\overline{B1}$ are connected in a first parallel combination, this parallel combination being connected in series with a second parallel combination of the contact of cryotron D and the contact of cryotron D̄ which is connected in series with the parallel-connected contacts of cryotrons B2 and $\overline{B2}$, the first and second combinations being connected in series with a third parallel combination comprising the contact of cryotron C̄ and the contact of cryotron C which is connected in series with the parallel-connected contacts of cryotrons A and Ā. The winding of cryotron 1 of the A*x* group is interposed in series with the contact of cryotron B1, indicated at point B in Fig. 12. The winding of cryotron 1 of the C*x* group is interposed in series with the contact of cryotron D, indicated at point D in Fig. 12. The winding of cryotron 0 of the C*x* group is interposed in series with the contact of cryotron D̄, indicated at point D̄ in Fig. 12. The winding of cryotron 0 of the A*x* group is interposed in series with the contact of cryotron $\overline{B2}$, indicated at point $\overline{BD}$ in Fig. 12. The winding of cryotron 0 of the D*x* group is interposed in series with the contact of cryotron A, indicated at point CA in Fig. 12. The winding of cryotron 1 of the B*x* group is interposed in series with the contact of cryotron Ā, indicated at point CĀ in Fig. 12. The windings of cryotron 0 of the B*x* group and cryotron 1 of the D*x* group are interposed in series with the contact of cryotron C̄, indicated at point C̄ in Fig. 12.

By means of a pulse of current applied by the source 51 at terminal 52 in part (*a*) of Fig. 13, the status of the A, B, C and D cryotrons is transferred with certain logical transformations to the four flip-flops A*x*, B*x*, C*x* and D*x* in the (*b*) part of the figure where the input cryotrons of these flip-flops are shown. Subsequently, the digits stored in the A*x*, B*x*, C*x* and D*x* cryotrons are transferred to the A, B, C and D cryotrons by the application of a pulse of current by the source 53 at terminal 54 in the (*b*) part of the figure. The transfer circuit in the (*b*) part of the figure is conventional inasmuch as it performs an elementary shifting operation without logical transformations. In the normal operation of the circuit, current pulses are applied alternately at terminals 52 and 54. The logical operations are performed by the circuits in the (*a*) part of the figure.

It may be observed that the pattern of digits at any step is a function of the pattern of digits in the previous step. That is, for example, if the pattern of binary digits is 1110, as it is on step 5, the pattern after one step of operation should be 1100 as indicated for step 6. With regard to any individual flip-flop, the function for setting the flip-flop to one state or the other may be determined by noting the status of the flip-flop on the previous step. Consider flip-flop A, for example. This flip-flop is to be 1 on steps 4, 5, 6, 7, 8 and 9. The combinations of binary digits which occur in the preceding steps (3, 4, 5, 6, 7 and 8) are 0111, 1111, 1110, 1100, 1001, and 1011. The A flip-flop is to be 0 on steps 0, 1, 2, and 3. The combinations of binary digits in the preceding steps (9, 0, 1, and 2) are 1010, 0000, 0001 and 0011. By noting that each combination of binary digits corresponds to an "and" function (0111 corresponds to ĀBCD, for example) logical functions are obtained in a straight-forward manner for setting A to 1 or to 0 as required. Six of the sixteen possible combinations of four binary signals are absent. These six are 0010, 0100, 0101, 0110, 1000, and 1101. In designing the logical arrangement, these combinations can have the effect of causing the flip-flop to be set in either direction, but since the combinations will never occur, the effect will be immaterial. The logical functions for the other flip-flops can be worked out in an analogous manner.

Although the procedure outlined in the previous paragraph will produce logical arrangements and circuits that will yield the intended results, circuits requiring fewer cryotrons can be found in another way. This other way is to note on which steps the digit stored in any specific flip-flop changes. For example, the A flip-flop changes from 0 to 1 when going from step 3 to step 4. Therefore, the A flip-flop, via the $Ax$ flip-flop as temporary storage, need receive a signal at the 1-input only when proceeding from step 3 to step 4. By studying the sequence pattern it may be observed that the fact that B is 1 can be used as the indication for setting A to 1 on the next step. The A flip-flop will receive a signal on the 1-input when going to steps 5, 6, and 7 as well as when going to step 4, but this situation is not undesirable because A should be 1 on these steps also. Flip-flop A will not receive a signal on the 1-input line when proceeding to steps 8 and 9, but this situation is satisfactory because no signal will be supplied to A to set it to 0 on these steps. However, flip-flop A should be set to 0 when proceeding from step 9 to step 0. It may be observed by studying the pattern that the signal for setting A to 0 may be obtained from the fact that both B and D are at 0 on step 9 and on no other step. Therefore $\bar{B}\bar{D}$ is the function to be used in setting A to 0.

By extending this analysis it can be found that the conditions or logical functions for setting the four flip-flops to the 1 and 0 states are as follows.

| | Set to 1 | Set to 0 |
|---|---|---|
| $Ax$ | B | $\bar{B}\bar{D}$ |
| $Bx$ | $\bar{A}C$ | $\bar{C}$ |
| $Cx$ | D | $\bar{D}$ |
| $Dx$ | $\bar{C}$ | AC |

This chart is to be interpreted that $Bx$, for example is to be set to 1 on each step after A is 0 "and" C is 1 and $Bx$ is to be set to 0 on each step after C is 0. Subsequent to the setting of $Bx$, B is set to the status of $Bx$ to complete the function of going from one step to the next.

Now referring particularly to Fig. 12, when current is passed from terminal 52 to ground, the path is through the branch containing point B if flip-flop B contains a 1. The path is through the branches containing points D or $\bar{D}$ according to whether flip-flop D contains a 1 or a 0, respectively. If B and D both contain 0's, the path is through the branch containing point $\bar{B}\bar{D}$. The current flows through the branch containing point $\bar{C}$ if flip-flop C contains a 0. The path is through the branches containing points CA or $C\bar{A}$ if flip-flop C contains a 1 and flip-flop A contains a 1 or a 0, respectively. The currents through the branches thus selected will flow through the appropriate input windings of the $Ax$, $Bx$, $Cx$, and $Dx$ flip-flops. Therefore, when a pulse of current is passed between terminal 52 and ground, the $Ax$, $Bx$, $Cx$ and $Dx$ flip-flops are set to states dependent on the A, B, C and D flip-flops in accordance with the chart given above. Then when a pulse of current is subsequently passed between terminal 54 and ground, each flip-flop in the A, B, C, and D group is set to the state of the corresponding flip-flop in the $Ax$, $Bx$, $Cx$, and $Dx$ group. Thus, current pulses applied alternately to terminals 52 and 54 cause the A, B, C, and D flip-flops, and the $Ax$, $Bx$, $Cx$, and $Dx$ flip-flops to cycle through the ten combinations of stable states that have been indicated.

When the circuit in Fig. 13 is operated as a counter, it is possible to supply continuously repetitive "clock" pulses to one or the other terminals 52 and 54. When a current pulse is to be counted it is applied to the opposite terminal at a time interspaced between two successive clock pulses.

Many variations can be worked out for counter circuits of the general type illustrated in Figs. 12 and 13. The particular circuit selected is for the purpose of illustrating the arrangement of connections for a transfer circuit that is applicable to computer functions in a generalized manner.

It has been shown by way of examples how one cryotron flip-flop or a group of cryotron flip-flops can be set to a state or a combination of states under the control of the states of two or more cryotron flip-flops by means of appropriate interconnections between the output cryotron of these other flip-flops.

In the preferred embodiments of the invention, the contacts of a plurality of transfer cryotrons (A, $\bar{A}$, B, $\bar{B}$, etc. in the drawing) are arranged, in a manner according to a digital type of operation to be performed, between a transfer current pulse source and input windings of the output cryotrons (0, 1 in the drawing). The input windings of the transfer cryotrons are connected in output circuits of binary flip-flop circuits, and serve to store simultaneously a plurality of bits of binary coded information in a predetermined arrangement so that, upon application of the transfer current pulse, the output cryotrons are set into a condition as determined by the digital type of operation which had been set up and temporarily stored in the transfer cryotrons. Typical operations which can thus be performed are "and," "or," and inversion types of logical functions. In accordance with the invention, various combinations of these functions can be performed simultaneously in relatively simple circuit arrangements.

It is to be understood that the disclosed arrangements are illustrative of the applications of the principles of the invention. Other arrangements may be devised by those skilled in the art without departing from the spirit and scope of the invention as defined in the claims.

What is claimed is:

1. A cryotron transfer circuit comprising a pair of load cryotrons each having an input winding and a contact adapted to be controlled by said input winding, a plurality of transfer cryotrons each having an input winding and a contact adapted to be controlled by said input winding, means connected to selectively apply binary input signals in one or more predetermined combinations to the input windings of said transfer cryotrons, a source of transfer current, and means interconnecting said source of transfer current, said contacts of the transfer cryotrons, and said input windings of the load cryotrons so as to selectively cause said transfer current to flow through a selected one of the input windings of said load cryotrons in accordance with different ones of said predetermined combinations of binary input signals, the contact of each of said load cryotrons being free from any cross-coupling with the input winding of the other load cryotron, whereby said selection of a load cryotron is entirely dependent upon said predetermined combinations of binary input signals and whereby said contacts of the load cryotrons are independently available for read-out connections.

2. A circuit as claimed in claim 1, in which said contacts of the transfer cryotrons are interconnected to provide two alternative paths for said transfer current, said input windings of the load cryotrons being respectively connected in different ones of said two alternative current paths, and in which the contacts of at least two of said transfer cryotrons are connected together in either one of a series and a parallel circuit arrangement in at least one of said two alternative current paths.

3. A circuit as claimed in claim 1, in which said contacts of the transfer cryotrons are interconnected to provide two alternative paths for said transfer current, said input windings of the load cryotrons being respectively connected in different ones of said two alternative current paths, there being at least two of said transfer cryotrons in each of said paths, and in which the contacts of at least two of the transfer cryotrons in one of said paths are connected together in series and the contacts of at least two of the transfer cryotrons in the other of said paths are connected together in parallel.

4. A circuit as claimed in claim 1, in which said contacts of the transfer cryotrons are interconnected to provide two alternative paths for said transfer current, said input windings of the load cryotrons being respectively connected in different ones of said two alternative current paths, at least one of said paths comprising a plurality of said transfer cryotrons having the contacts thereof connected together in a series combination and an additional cryotron having the contact thereof connected in parallel with said series combination.

5. A circuit as claimed in claim 1, in which said contacts of the transfer cryotrons are interconnected to provide two alternative paths for said transfer current, said input windings of the load cryotrons being respectively connected in different ones of said two alternative current paths, at least one of said paths comprising a plurality of said transfer cryotrons having the contacts thereof connected together in a parallel combination and an additional cryotron having the contact thereof connected in series with said parallel combination.

6. A circuit as claimed in claim 1, in which said contacts of the transfer cryotrons are interconnected to provide two alternative paths for said transfer current, the winding of a cryotron having the contact thereof in a first of said paths being interposed in the second of said paths.

7. A circuit as claimed in claim 6, including means connected in said first path for temporarily inhibiting current flow therein.

8. A circuit as claimed in claim 7, in which said means for temporarily inhibiting current flow comprises an inductance.

9. A circuit as claimed in claim 1, including an additional cryotron having a contact and an input winding, means to selectively apply a control signal to the input winding of said additional cryotron, and means connecting the contact of said additional cryotron to provide a controlled shunt path for said transfer current thereby to selectively divert said transfer current from the input winding of one of said load cryotrons under the control of said control signal.

10. A cryotron transfer circuit comprising a pair of load cryotrons each having an input winding and a contact adapted to be controlled by said input winding, a source of transfer current, a first plurality of transfer cryotrons each having an input winding and a contact adapted to be controlled by said input winding, means interconnecting said contacts to provide a first current path between said source of transfer current and the input winding of one of said load cryotrons, a second plurality of transfer cryotrons each having an input winding and a contact adapted to be controlled by the input winding thereof, means interconnecting said last named contacts to provide a second current path between said source of transfer current and the input winding of the other of said load cryotrons, and means connected to selectively apply binary input signals in one or more predetermined combinations to the input windings of said transfer cryotrons, whereby said transfer current is selectively directed through the input winding of a selected one of said load cryotrons, the contact of each of said load cryotrons being free from any cross-coupling with the input winding of the other load cryotron, whereby said selection of a load cryotron is entirely dependent upon said predetermined combinations of binary input signals and whereby said contacts of the load cryotrons are independently available for read-out connections 11. A circuit as claimed in claim 10, including an additional cryotron having a contact interposed in said first current path and having a control winding interposed in said second current path.

12. A circuit as claimed in claim 11, including means connected in said first current path for temporarily inhibiting current flow therein.

13. A circuit as claimed in claim 10, including an additional cryotron having a contact and an input winding, means to selectively apply a control signal to the input winding of said additional cryotron, and means connecting the contact of said additional cryotron to provide a controlled shunt path for the transfer current in at least one of said current paths thereby to selectively divert said transfer current from the input winding of one of said load cryotrons under the control of said control signal.

14. A circuit as claimed in claim 10, in which the contacts of at least two of said first plurality of transfer cryotrons are connected together in a series combination and in which the contacts of at least two of said second plurality of transfer cryotrons are connected together in a parallel combination.

15. A circuit as claimed in claim 14, in which the contact of an additional one of said first plurality of transfer cryotrons is connected in parallel with said series combination, and in which the contact of an additional one of said second plurality of transfer cryotrons is connected in series with said parallel combination.

16. A full adder for use in a binary adder circuit, comprising a pair of load cryotrons each having an input winding, a source of transfer current, an intermediate terminal, a first circuit connected between said source of current and said terminal and comprising a plurality of transfer cryotrons having input windings and having contacts arranged to form a two-terminal network and first and second additional cryotrons each having a winding connected in a series arrangement with said network and each having a contact, a second circuit connected between said source of current and said terminal and comprising windings of at least one further cryotron connected in series with the contact of said first additional cryotron, a first circuit connected between said terminal and an end of the winding of one of said load cryotrons and comprising a plurality of transfer cryotrons having input windings and having contacts arranged to form a second two-terminal network, the contact of said second additional cryotron being included in said second network, a third additional cryotron having a winding connected in series with said second network and having a contact, and a second circuit connected between said terminal and an end of the winding of the other of said load cryotrons and comprising the contact of said third additional cryotron, means for providing a return path from the remaining ends of the windings of said load cryotrons to said source of transfer current, and means connected to supply binary input signals to the input windings of said transfer cryotrons.

17. A counter circuit comprising a first plurality of flip-flop circuits and a second plurality of flip-flop circuits, each of said flip-flop circuits comprising a pair of input cryotrons and at least one pair of output cryotrons, each of said cryotrons comprising a contact and an input winding, means respectively connecting terminals of the contacts of the output cryotrons of each of said first plurality of flip-flop circuits to ends of the input windings of the input cryotrons of different ones of said second plurality of flip-flop circuits, means successively connecting the remaining ends of the input windings of each pair of input cryotrons of said second plurality of flip-flop circuits to the remaining terminals of the contacts of the output cryotrons of successively different ones of said first plurality of flip-flop circuits thereby to form a first network, a first source of pulses interposed in said first network whereby said first network forms a signal shifting circuit, a second source of pulses, and means interconnecting said second of pulses, the contacts of the output cryotrons of said second plurality of flip-flop circuits, and the input windings of the input cryotrons of said first plurality of flip-flop circuits thereby to form a second network in a predetermined arrangement for performing logical signal transfer operations from the second to the first of said pluralities of flip-flop circuits.

18. A circuit as claimed in claim 2, in which said contacts of at least two of the transfer cryotrons are connected together in a series circuit arrangement.

19. A circuit as claimed in claim 2, in which said contacts of at least two of the transfer cryotrons are connected together in a parallel circuit arrangement.

20. A cryotron transfer circuit comprising a pair of load cryotrons each having an input winding, a plurality of transfer cryotrons each having an input winding and a contact adapted to be controlled by said input winding, a source of transfer current, means connecting an end of each of the input windings of said load cryotrons to a terminal of said source of transfer current, the contacts of a first group of said transfer cryotrons being connected together in series in a circuit between the remaining end of a first one of said load cryotron input windings and the remaining terminal of said source of transfer current, the contacts of a second group of said transfer cryotrons being connected together, in parallel in a circuit between the remaining end of the second one of said load cryotron input windings and said remaining terminal of the source of transfer current, and means connected to selectively apply binary input signals in one or more predetermined combinations to the input windings of said transfer cryotrons so as to selectively cause said transfer current to flow through one or the other of said input windings of the load cryotrons.

21. A circuit as claimed in claim 20, including an additional cryotron having a contact connected in parallel with the series-connected contacts of said first group of transfer cryotrons to form a series-parallel combination.

22. A circuit as claimed in claim 21, including a further cryotron having a contact connected in series with said series-parallel combination.

23. A circuit as claimed in claim 20, including an additional cryotron having a contact connected in series with the parallel-connected contacts of said second group of transfer cryotrons to form a series-parallel combination.

24. A circuit as claimed in claim 23, including a further cryotron having a contact connected in parallel with said series-parallel combination.

25. A circuit as claimed in claim 20, including a first additional cryotron having a contact connected in parallel with the series-connected contacts of said first group of transfer cryotrons to form a first series-parallel combination, a first further cryotron having a contact connected in series with said series-parallel combination, a second additional cryotron having a contact connected in series with the parallel-connected contacts of said second group of transfer cryotrons to form a second series-parallel combination, and a second further cryotron having a contact connected in parallel with said second series-parallel combination.

References Cited in the file of this patent

Buck: The Cryotron, IRE Proceedings, April 1956, pages 482–493.

Automatic Control, August 1956, pp. 21, 22, 23.

Electrical Engineering February 1954, Transactions of A.I.E.E., Boolean Algebra in Circuit Design by Washburn page 164.